US006360804B1

(12) United States Patent
Field et al.

(10) Patent No.: US 6,360,804 B1
(45) Date of Patent: *Mar. 26, 2002

(54) HAND TOOL FOR ADHESIVE STRIP APPLICATION

(75) Inventors: Stephen Field; Raymond Pek, both of Ottawa (CA); Gerhard Reichert, New Philadelphia, OH (US); Michael Glover, Ottawa (CA)

(73) Assignee: Edgetech I.G. Inc., Cambridge, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/395,191

(22) Filed: Sep. 14, 1999

Related U.S. Application Data

(63) Continuation-in-part of application No. 09/042,190, filed on Mar. 13, 1998, now Pat. No. 6,116,315.

(30) Foreign Application Priority Data

Mar. 14, 1997 (CA) .............................................. 2200024

(51) Int. Cl.⁷ .............................................. B32B 35/00
(52) U.S. Cl. ...................... 156/523; 156/526; 156/574; 156/577; 156/579
(58) Field of Search ................................. 156/523, 526, 156/574, 577, 579

(56) References Cited

U.S. PATENT DOCUMENTS

| 2,916,079 A | 12/1959 | Schiefer |
| 4,495,023 A | 1/1985 | Lisec |
| 4,561,929 A | 12/1985 | Lenhardt |
| 4,600,466 A | 7/1986 | Herrmann |
| 4,708,762 A | 11/1987 | Lenhardt |
| 4,743,336 A | 5/1988 | White |
| 4,756,789 A | 7/1988 | Kolff |
| 4,769,105 A | 9/1988 | Lisec |
| 4,849,063 A | 7/1989 | McXinnon |
| 5,013,377 A | 5/1991 | Lafond |
| 5,045,146 A | 9/1991 | Rundo |
| 5,246,331 A | 9/1993 | Hallahan et al. |
| 5,472,558 A | 12/1995 | Lafond |
| RE35,291 E | 7/1996 | Lafond |
| 5,635,019 A | 6/1997 | Lafond |
| 5,762,738 A | 6/1998 | Lafond |
| 5,888,341 A | 3/1999 | Lafond |
| 5,975,181 A | * 11/1999 | Lafond ........................ 156/523 |
| 6,116,315 A | * 9/2000 | Field et al. .................. 156/523 |
| 6,138,735 A | * 10/2000 | Field et al. ............. 156/523 X |
| 6,148,890 A | * 11/2000 | Lafond .................... 156/523 X |

* cited by examiner

Primary Examiner—Curtis Mayes
(74) Attorney, Agent, or Firm—Wenderoth, Lind & Ponack, L.L.P.

(57) ABSTRACT

A hand tool for applying adhesive strip material to a glass sheet in the fabrication of double glazed windows has a body with a channel extending through the lower side thereof to guide an adhesive strip therethrough and a positioning member adjacent the channel for guiding the tool along the edge of a glass sheet. An adjustable wheel applies pressure on the strip to urge it to adhere with the glass sheet and a cutting mechanism mounted on the body is selectively operable for partially cutting the strip (as when the strip has to be bent through 90° at a corner of the glass sheet) and for fully cutting the strip (as when the strip applying step has been completed). The tool includes a pusher element carried adjacent one side of the channel and selectively operable to push the strip in the channel laterally into a side extension into full registration with the cutter when it is desired to settle the strip at the end of the strip applying operation. When the cutter is actuated without the pusher element being operated, the strip is only partially cut.

16 Claims, 12 Drawing Sheets

HAND TOOL FOR ADHESIVE STRIP APPLICATION

CROSS REFERENCE TO RELATED APPLICATIONS

This is a continuation-in-part of U.S. patent application Ser. No. 09/042,190 filed Mar. 13, 1998, now U.S. Pat. No. 6,116,315.

BACKGROUND ON THE INVENTION

1. Field of the Invention

This invention relates to a manual method and apparatus for applying a flexible adhesive strip around the perimeter edge of a rigid substrate. More particularly, the present invention relates to an improved manual method and apparatus for applying an insulating edge strip onto glass sheets as part of the manufacturing process of insulating glass units.

2. Description of the Prior Art

Insulating glass units can be manufactured using a horizontal or vertical production line.

The advantages of vertical unit production include: higher productivity; lower equipment costs; less floor space; convenient glass handling, including; large glass sheets, easy on-line gas filling, and simpler automation of various unit production operations, including, glass feed, glass movement, unit assembly and sealant gunning.

To simplify the production of insulating glass units, various adhesive strip products have been developed. One such product is described in U.S. Pat. 4,831,799. The product is manufactured from flexible thermoset rubber foam that incorporates desiccant fill material and features a vapor barrier backing film and acrylic side adhesive. The side adhesive is protected by a flexible release liner that allows the material to be packaged on reels. This adhesive strip product has been commercialized by Edgetech IG Inc and is marketed under the registered trademark of Super Spacer®.

Adhesive strip products are typically applied with the glass in a horizontal position. As described in U.S. Pat. No. 5,246,331 issued to Hallahan et al, an air flotation assembly table is typically used. To reduce worker movement to a minimum, the air flotation table features a moveable suction cup that successively rotates the glass through 90° and linearly moves the glass to a convenient position close to the perimeter edge of the table. Although the glass is located close to the operator, the hand tool must be held in position as the glass is rotated around. As a result, there can be abnormal movement of the operator's body including: prolonged spinal curvature; unnatural trunk rotation, and hyperextension of the shoulder, elbow and arm. In the long term, this abnormal movement may potentially cause repetitive stress disorders and related health problems.

For manual application of adhesive strip products on a vertical production line, the glass sheets are tilted down to a horizontal position for strip application and the strip is applied using conventional rotating tables and hand tools. For unit assembly, the glass sheets must then be tilted back into a vertical position and because of this extra glass movement, productivity is reduced.

The adhesive strip product described in U.S. Pat. No. 4,831,799 incorporates a vapor barrier backing. To provide corner continuity of the vapor barrier, a half circular notch is made in the spacer and this creates a flex point that allows for easy corner formation. Various application tools have been developed for forming these notched corners and as documented in photographs of a prototype Edgetech application tool, one way of forming these corner notches is through the use of a slidable circular punch. When activated, the hollow punch removes a half circular portion or slug of strip material. Because of the acrylic side adhesive, these slugs adhere together and as a result, the slug material can be easily ejected from the tool. The advantage is that the tool can remain in continuous contact with the glass and the productivity of strip application is improved.

At the final corner, there are further productivity advantages if the tool can also incorporate a blade for cutting through the adhesive strip. As described in U.S. Pat. No. 5,472,558 issued to Lafond, one approach is add a separate blade that operates in combination with the punch to both notch and cut through the adhesive strip at the final corner.

Although productivity is improved, experience has shown that this simultaneous operation of the punch and cutting blade requires a complicated punch design that is expensive to manufacture and is prone to wear and damage.

Compared to the earlier Edgetech tools, another new feature of the Lafond tool is that both the pneumatic cylinder and strip feeding channel are steeply inclined at angle and this has the advantage of a reduced channel length between the pneumatic cylinder and the pressure wheel. However, the drawback is that after strip cut-off, the tool requires to be re-threaded and this can be a time consuming operation.

For operating the pneumatic cylinder, the Lafond tool also features a finger trigger that is located below a cylindrical handle and operated by means of a finger pulling action. With horizontal strip application using a rotary table, there are three main ergonomic drawbacks to this arrangement. First, it provides for wrist deviation with rapid finger movement. Second, it combines forceful gripping with a twisting action and third, it requires rapid and forceful pronation with strong elbow and wrist flexion.

The tool of U.S. Pat. No. 5,472,558 Lafond is also limited to producing a notched corner. An alternative corner application detail is to partially cut through the back face of the adhesive strip and create an open-ended corner. Although in this arrangement the barrier film is not continuous, the open-ended corner allows for additional sealant material to be applied at the corners and this ensures that the edge-seal integrity of the insulating glass unit is not downgraded.

SUMMARY OF THE INVENTION

The present invention provides a hand tool for applying adhesive strip material to a substrate having an edge and a major face, said hand tool comprising: a body having a lower surface and a channel extending therethrough adjacent said lower surface for receiving a strip of material therein; a substrate positioning member located close to said channel on said lower surface of said body for guiding said tool along said edge of said substrate, said lower surface of said body being elevated from said major face by said strip when said strip is fed through said channel; an adjustable wheel for applying pressure on said strip to urge said strip to adhere with said substrate major face; and a cutting mechanism mounted on said body, said cutting mechanism being selectively operable for partially cutting said strip and for fully cutting said strip.

The cutting mechanism is preferably provided by a cutter and a displacement means that is selectively operable to shift relative alignment of the strip with respect to the cutter so that the cutter can partially or fully cut through the strip as desired. For example when applying a spacer strip around a rectangular glass sheet, starting at one corner and extending successively along each edge, at the second, third and fourth corners the spacer strip will be partially cut to facilitate its bending through a right angle at that corner, whereas when all four sides have been complete, the strip will be severed at the first corner.

In a preferred embodiment of the hand tool the cutter is in the form of a reciprocating punch or knife oriented substantially at right angles to the channel, and a displacement means is effective to displace the strip laterally in the channel so that the strip which is normally partially aligned with the cutter, but when the strip is to be severed, it is moved to become fully aligned with the cutter. It will be appreciated that the same effect can be achieved by arranging for the cutter rather than the strip to be displaceable laterally with respect to the channel.

The cutter can be in the form of a hollow tubular punch aligned to cut an arcuate notch out of the strip to facilitate bending thereof at a corner of the substrate, but capable of alignment to fully sever the strip when required. With this arrangement the strip is bent at the corner in a direction to close up or reduce the arcuate notch. In an alternative configuration the cutter is in the form of a knife which partially cuts through the strip to form a slit at a location where a corner is to be formed. It will be understood that in this configuration the strip is bent so that the sides of the slit lie approximately 90° and face outwards at the corner of the substrate.

Where the strip within the channel is to be laterally displaced, this is readily effected by a simple pusher element carried in the side of the body and operable to displace the strip laterally when desired. While it is possible for the pusher element to be spring loaded and to engage a U-shaped cradle in the channel through which the strip is passed, displacing this cradle laterally when the strip is to be severed, in a simpler and much cheaper arrangement it is sufficient for the pusher element to be a plastic part loosely guided in a wall of the body adjacent the channel and having a pad surface that can engage the side of the strip material and push it laterally into an extension on the opposite side of the channel. No springs are necessary, and when the pusher element is released it will be restored to its non-actuated condition simply by the resilience of the strip material. The pusher element is furthermore preferably designed to clamp within the channel the severed end of the strip material leading from the supply, so that the strip material does not have to be re-threaded into the tool in subsequent application operations.

A method for use by an operator in applying an adhesive strip to a surface border area around the periphery of a rigid substrate having a flat major face, may involve the steps (a) locating the substrate in a generally upright position to present said major face towards the operator; (b) providing a hand tool which is adapted for manipulation by the operator for applying said adhesive strip to said substrate; (c) supplying a continuous length of adhesive strip material from a supply to said hand tool; (d) wherein the operator manipulates said hand tool to pass along said periphery to apply said strip of adhesive material to said border surface area of said major face around the entire periphery of the substrate.

The adhesive strip material is delivered from a reel behind the operator through an overhead guide to a discharge position above and in front of the substrate. Release liners on the strip are preferably peeled off as the strip exits from the guide.

Where the substrate is of rectangular outline with four corners, adhesive strip typically is applied starting at one corner and then continuously along the lengths of the four sides, the strip being notched or partially cut to facilitate its bending through 90° at each of the second, third and fourth corners, and finally severed when it is returned to the first corner.

Conveniently where strip application is being done by a right handed operative, the starting point is typically the upper end of the left hand edge of the substrate. To facilitate the strip application operation and reduce operator fatigue the substrate is preferably mounted so that it can be moved vertically to a preferred working height. For example, use may be made of moveable suction cups which engage the substrate so that it can be adjusted vertically during application so that the instantaneous point of application of the strip is at all times conveniently located with respect to the operator.

The body and handle of the tool are preferably ergonomically shaped for comfort in use and to allow engagement of the tool by multiple and changing hand positions. The punch is preferably selectively operated by the fingers or thumb of the hand in which the tool is held, suitable actuators requiring pushing action from a finger or thumb onto a lever or button.

The components of the hand tool preferably are detachable, and the tool has a body to which the components can be attached alternatively for use in right handed or left handed mode. The tool includes a removable front face plate which at its lower end incorporates a slot at the top of which is a for guiding the strip into the tool channel, the face plate also including a large opening through which slugs cut from the strip by the punch are ejected.

The lower face of the tool is preferably provided as a removable wear plate, and the positioning member as a reversible pad that is releasably attached to the lower surface of the body, these parts being of plastic material which will minimize damage to the substrate.

The pressure wheel which rides on the strip within the tool channel is preferably height adjustable by means of a finger actuated rotatable nut carried by a threaded stem on which the pressure wheel is supported.

The invention will further be described, by way of example only, with reference to the embodiments illustrated in the accompanying drawings, wherein:

DETAILED DESCRIPTION OF THE PREFERRED EMBODIMENTS

Figure 1:
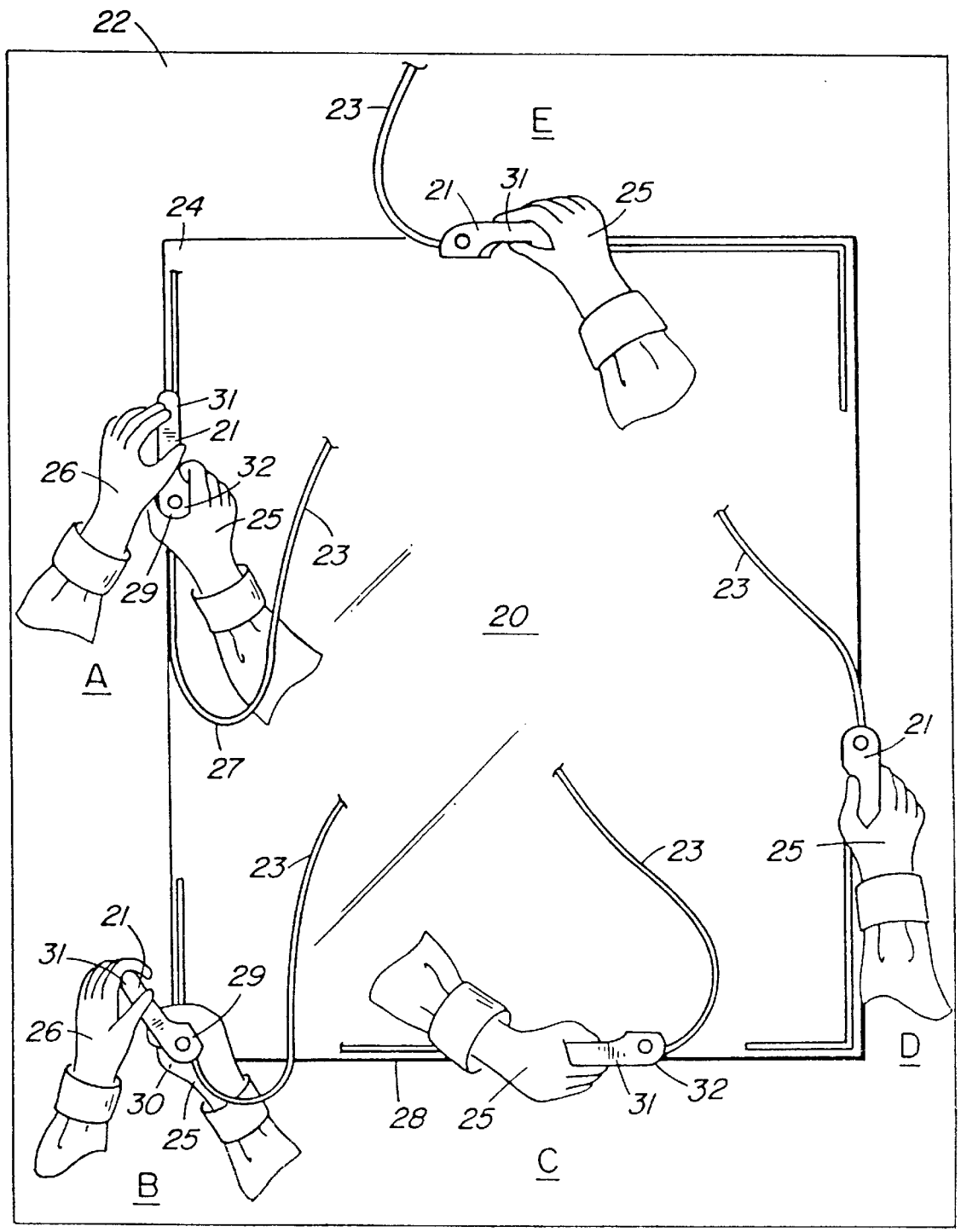
FIG. 1 shows perspective views of tool manipulation at positions A, B, C, D, and E, for the application of an adhesive strip on a vertical glass sheet.

FIG. 1 is a perspective view of the production steps required for vertical strip application using a hand tool 21. The glass sheet 20 is located on a vertical work surface 22 and is positioned by the operator at a convenient working height. Generally it is easier if the adhesive spacer strip 23 is fed from above the vertical work surface 22 and that for a right handed operator, this typically means that spacer application starts at the top left corner 24 of the glass sheet 20. The operator first feeds the adhesive strip 23 through a channel within a hand tool 21 and holds the adhesive strip against a back support block using the right hand 25. Using the left hand 26, the adhesive strip 23 is then pulled downwards creating a loop 27 that extends down to about the bottom edge 28 of the vertical glass sheet 20. The purpose of this loop 27 is to ensure that during application, the adhesive strip 23 moves easily into the tool and is not excessively stretched.

Initially as shown in position A, the tool is held in the palm 29 of the right hand 25 and is also partially supported by the left hand 26. As the tool approaches the bottom left corner 30 of the glass substrate (See position B), the hand positions are readjusted so that the tool handle 31 is held conventionally in the right hand 25 (See position C). To provide for these multiple hand positions, the front face 32 and handle 31 of the tool 21 are ergonomically shaped, The adhesive strip 21 is then conventionally applied to the other three sides of the vertical glass sheet 20 (See positions C, D and E) and at the final corner 24, the adhesive strip 23 is cut off.

Although for rectangular glass sheets, it is preferable that for the adhesive strip 21 is fed from above the vertical work surface 22, it is feasible especially with roundtop units, for adhesive strip application to start at the bottom right or left-hand corners.

Figure 2:
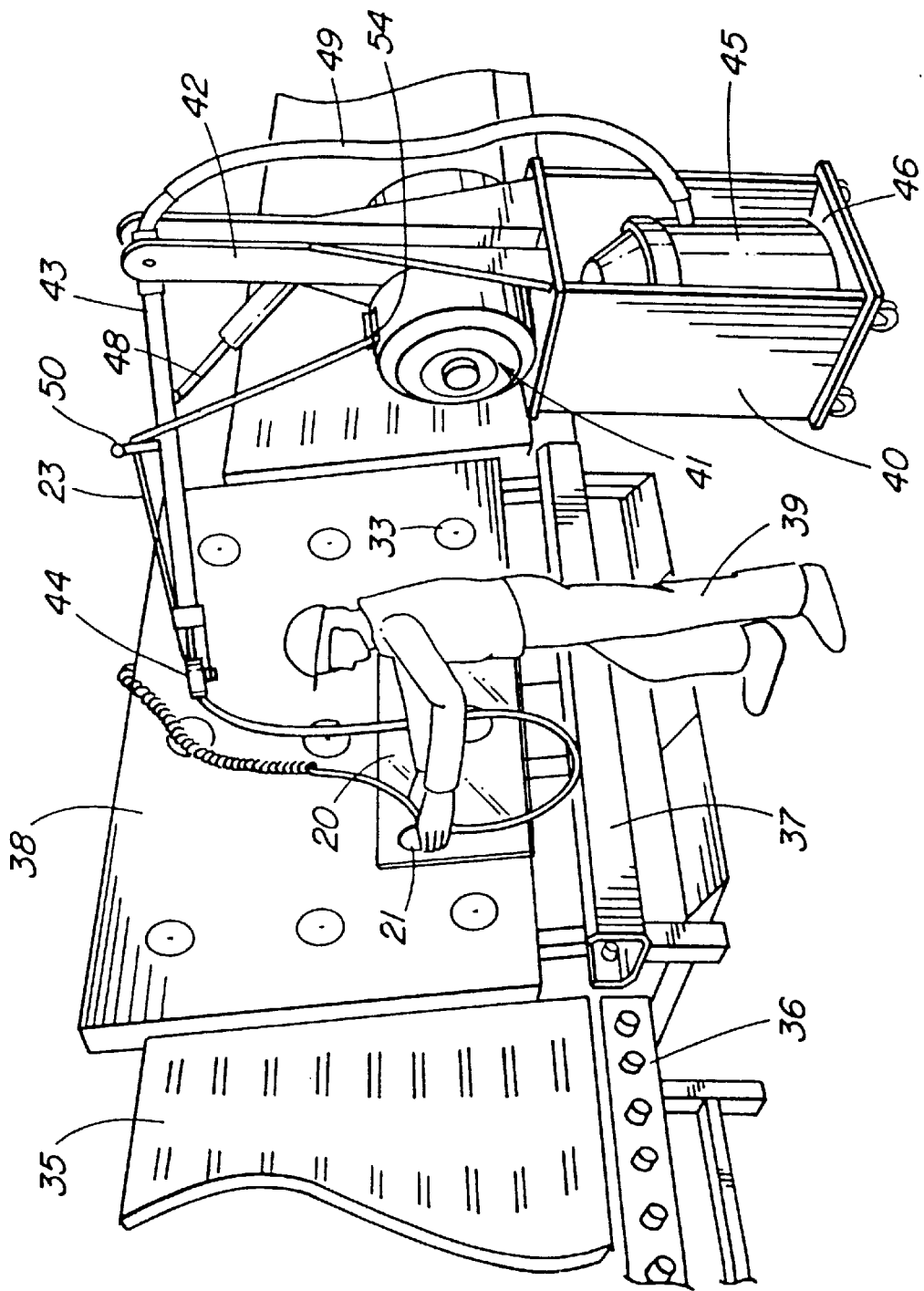
FIG. 2 is a perspective view of the production equipment for vertical adhesive strip application.

FIG. 2 shows a perspective view of part of a vertical insulated glass production line 35 incorporating a castor wheel track 36 and a vertical air-float application station 37. A glass sheet 20 is located on a moveable work surface 38 and is firmly held in place using vacuum cups 33. The glass sheet 20 is raised to a convenient work height by the operator 39.

A support module 40 supplies the adhesive strip material 23 at a central location immediately above the vertical application station 37. The adhesive strip material 23 is packaged on reels and to protect the desiccant material within the adhesive strip, the reels are stored in sealed enclosures 51 The reels are located on the support module 40 that features a double reel stand 41, a central pivot support 42, a pivot arm 43, a vacuum liner remover 44, an industrial vacuum system 45 and sound insulated box 46.

To allow for convenient access by the operator to both the support module 40 and also to the vertical application station 37, the support module 40 is located about four feet in front of the vertical application station 37. Also to provide for easy loading and unloading of the reels, the double reel stand 41 is located about three to four feet above the floor level To minimize material wastage when changing adhesive strip sizes, the vacuum liner remover 44 is centrally located just above the application station 37. The vacuum liner remover 44 is supported by a pivot arm 43 that is connected to a central pivot support 42 The adhesive strip material 23 is directed to the vacuum liner by means of guide 50 To allow for easy access to the vacuum liner remover 44, the pivot arm 43 can be manually pivoted downwards and when released, the pivot arm 43 reverts back to its original position due to the use of a gas cylinder 48.

Because the vertical application of the adhesive strip 23 requires the intermittent use of both hands, the strip must be capable of being unwound very easily from the reels. To reduce the physical effort required for unreeling the adhesive strip 23, the double reel stand 41 features a reel clutch assembly 49 that is described in FIG. 4. To further reduce friction forces, the protective liner is removed by a vacuum suction process and this is achieved by the vacuum liner remover 44 being connected by a flexible hose 49 to an electrically-powered industrial vacuum system 45. One suitable industrial vacuum cleaner is a Dust Bane PC-3 model. To provide for a quiet working environment, the vacuum system 45 is located within a sound insulating box 46.

Figure 3:
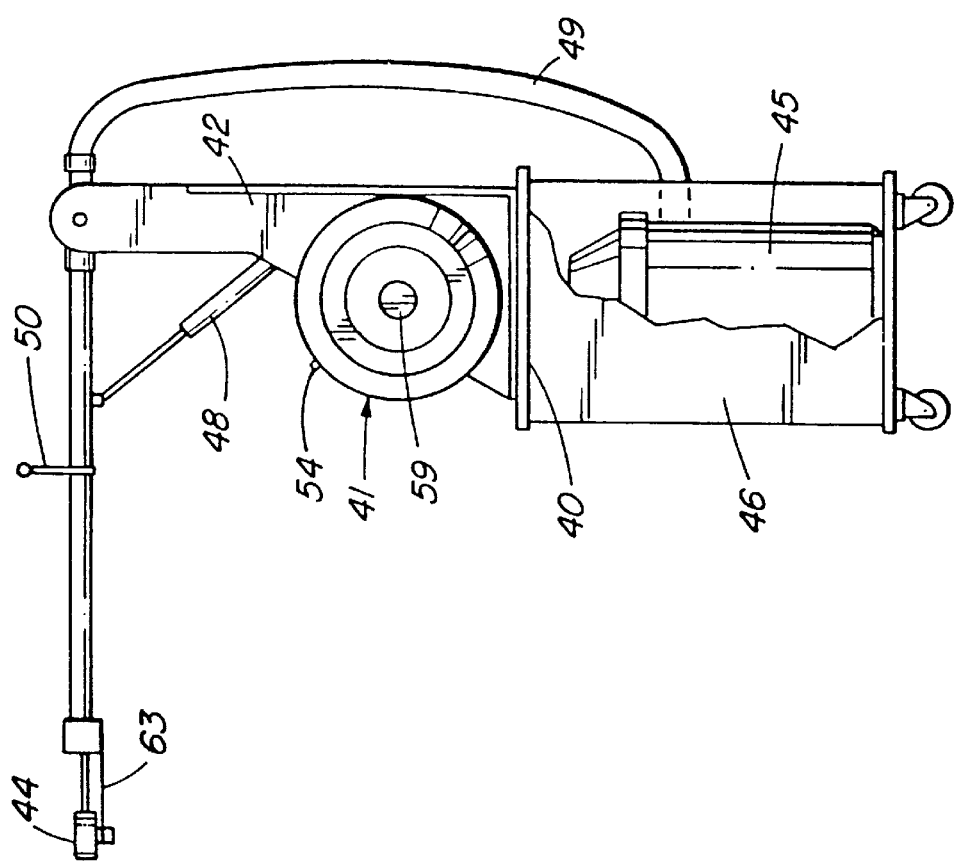
FIG. 3 is a side elevation view of the support module.

FIG. 3 shows a side elevation view of the support module including a cut-away view of the vacuum system 45.

Figure 4:
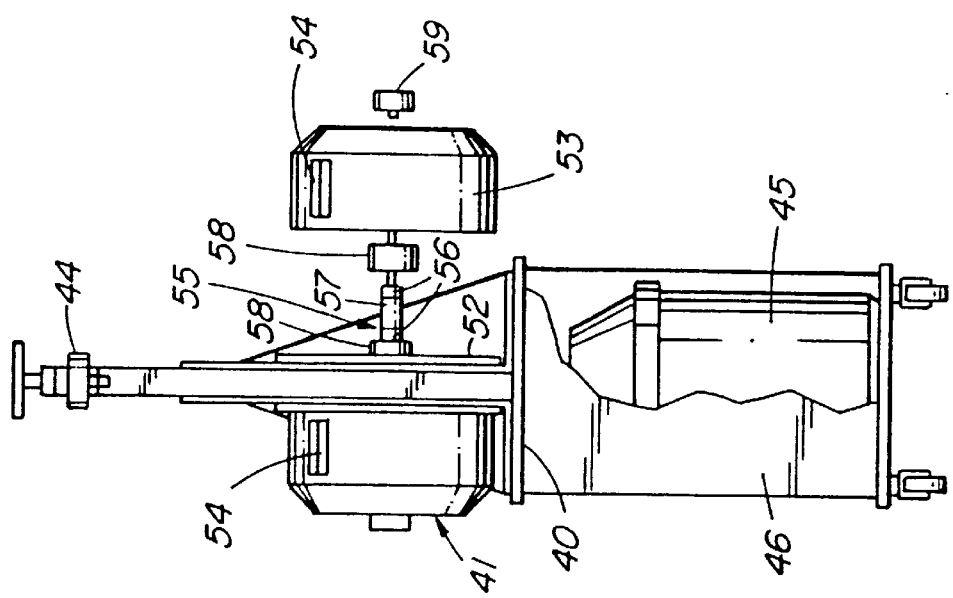
FIG. 4 is a front elevation view of the support module.

FIG. 4 shows a front elevation view of the support module including an exploded view of the double reel stand 41, including the sealed enclosure 51 and the double reel clutch assembly 55. The sealed enclosure 51 consists of a circular back plate 52 and a circular reel cover 53 incorporating a bristle-edge slot opening 54 for additional moisture protection. The reel clutch assembly 51 consists of a support rod (not shown), cylindrical finger bearings 56, a spacer 57, front and rear pressure pads 58 and a pressure knob 59.

Figure 5:
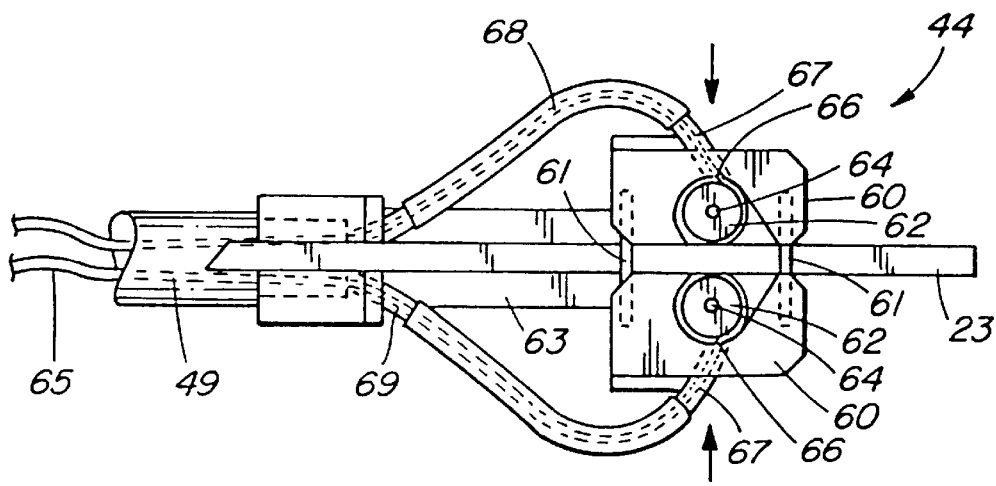
FIG. 5 is a top plan view of a liner remover.

FIG. 5 is a top plan view of a vacuum liner remover 44 that consists of two plastic housing sections 60 that are connected by two sets of double alignment pins 61. One of the plastic housing sections 60 is fixed in position and is bolted to the liner remover support plate 63. The second housing section can slide back and forth on the alignment pins 61 and this allows the spacing between the plastic sections to be easily adjusted so that light pressure can be applied by the pressure wheel 62 to the adhesive strip 23. Once fixed in position, the second housing section is also bolted to the liner support plate 63 and is moveable by means of a slotted hole in the support plate 63. To provide some friction resistance, the pressure wheels 62 feature a light durometer plastic or rubber surround. The pressure wheels 62 are connected by shoulder bolts 64 to the two plastic housing sections 60.

When the liner remover 44 is in operational use, the adhesive strip passes between the two pressure wheels 62 and the flexible protective liner 65 is removed from both sides of the adhesive strip 23 using vacuum suction in combination with some mechanical action. The two liners 65 are peeled away from the adhesive strip 21 and are passed around the two pressure wheels 62. The two liners are then respectively fed into two small openings 66 that are located tangentially to the pressure wheels 62. Metal tubular connections 67 are embedded within the plastic housing sections 60 and are linked by two flexible plastic tubes 68 to a Y-connector 69 attached to single flexible vacuum hose 49 that feeds to an industrial vacuum system 45.

Figure 6:
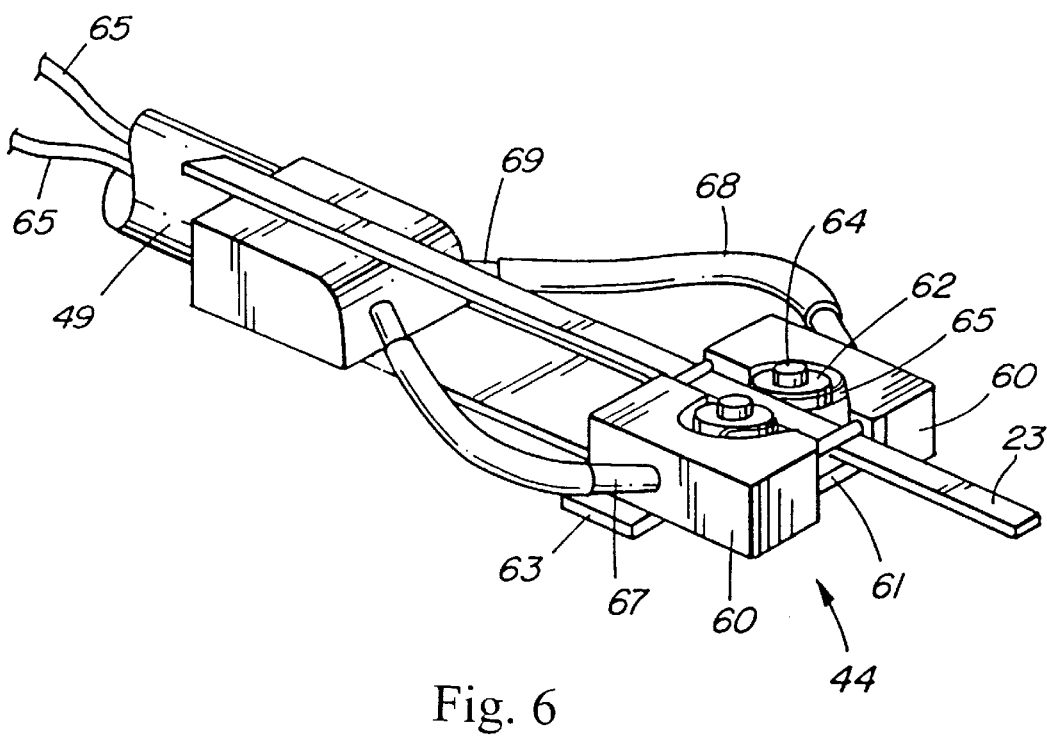
FIG. 6 is a top perspective view of a vacuum liner remover.

FIG. 6 shows a top perspective view of the vacuum liner remover. When the vacuum system is in operation, the protective liners 65 are easily removed from the adhesive strip 23 through suction, and with the pressure wheels 62 providing minimum frictional resistance to the movement of the adhesive strip 23.

Figure 7C:
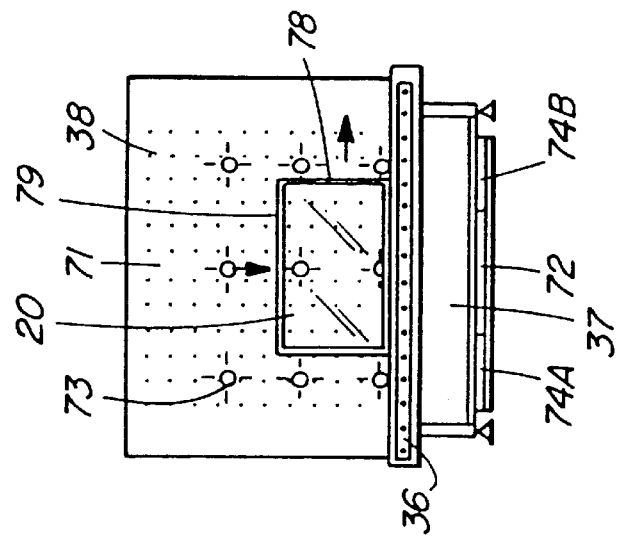
FIG. 7 shows a series of elevation views A, B and C of a vertical application station incorporating a moveable suction cup.
Figure 7B:
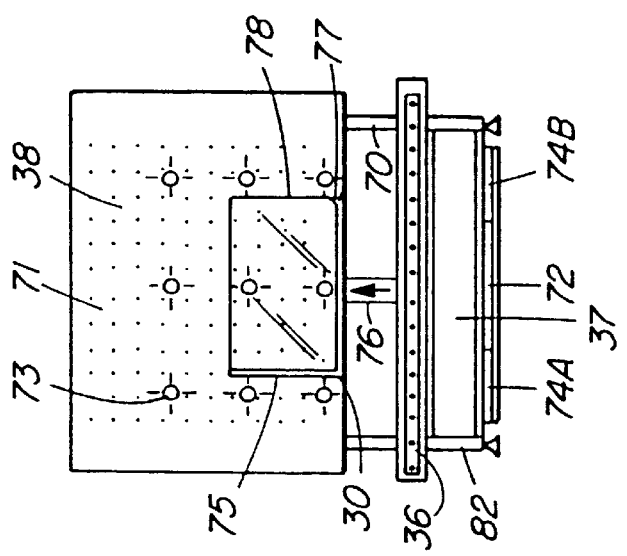
Figure 7A:
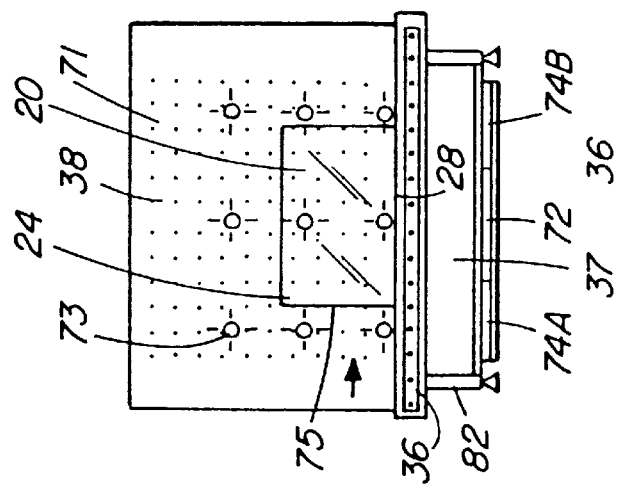

FIG. 7 shows a series of elevational views A, B, and C of a vertical application station 37 incorporating a moveable work surface 39 that is supported on a vertical sub frame assembly 70. The moveable work surface 38 is connected to the two structural leg supports of 82 vertical sub frame assembly 70 using a slide bearing and linear track system (not shown). To provide for horizontal glass movement, the vertical application station 37 incorporates a caster wheel track 36 and the moveable work surface 38 also incorporates an air float surface 71.

As part of an insulating glass product line, the vertical application station is typically located adjacent to a vertical washer (not shown), and the height of the caster wheel track 36 is typically the same height as the exit track from the vertical washer.

After the glass sheet 20 has been washed, it is transferred from the vertical washer to the vertical application station 37 with bottom glass edge 28 riding on the caster wheel track 36. The glass sheet 20 is approximately centered along the moveable work surface 38. The suction cups 73 are activated through operation of the center foot pedal 72 and the glass sheet 20 is firmly held in position against the work surface 38. The hand tool (not shown) is positioned on the top left corner 24 of the glass sheet 20. Through operation of the left side foot pedal 74A, the moveable work surface 38 is raised upwards by means of a centrally located cylinder 76 that can be powered by pneumatic, hydraulic or electro-servo means.

As the glass sheet 20 is raised upwards, the adhesive strip 23 is applied to the left hand side 75 of the glass sheet 20. When the glass sheet 20 reaches a preferred working height, the glass sheet 20 is stopped in position. By manipulating the hand tool (not shown), the adhesive strip 23 is applied around the bottom left corner 30 of the glass sheet 20. Using the hand tool, the adhesive strip 23 is then applied along the bottom edge and around the bottom right corner 77. Through the operation of the right side foot panel 74B, the moveable working surface 38 is then lowered and the adhesive strip 23 is applied to the right hand side 78 of the glass sheet 20. The adhesive strip 23 is then applied around the top right corner and along the top edge 79 of the glass sheet 20. Once strip application is complete and the glass sheet is again positioned on the castor wheel track, the vacuum suction cups 73 are released and the glass sheet 20 can be transferred to the next stage in the vertical production line.

Figure 8C:
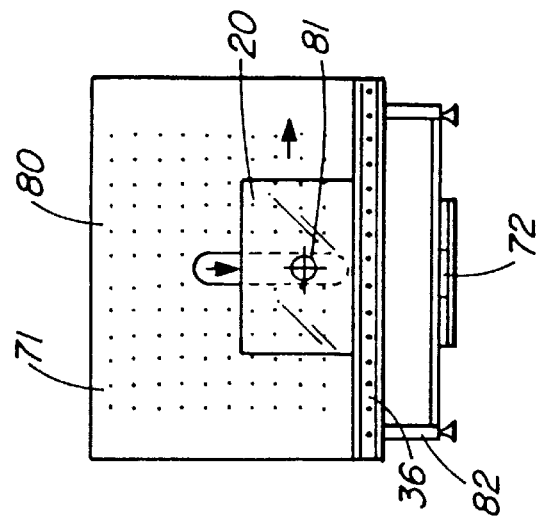
FIG. 8 shows a series of elevation views A, B and C of a vertical application station incorporating a moveable work surface.
Figure 8B:
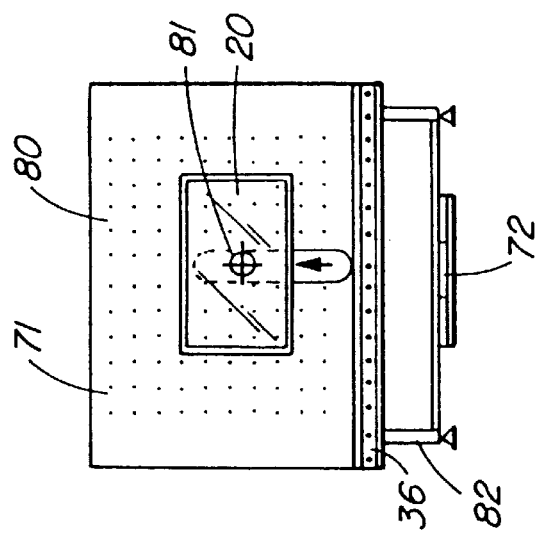
Figure 8A:
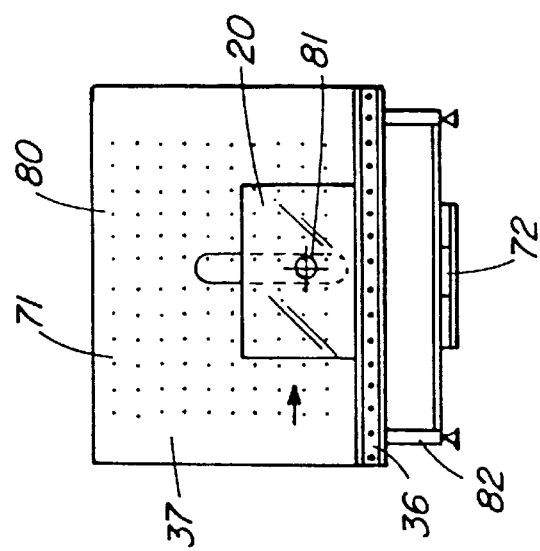

FIG. 8 shows a series of elevational views of a vertical application station 37 incorporating a moveable suction cup 81. A glass sheet 20 is centrally located on the air float work surface 71 and using a moveable suction cup 81, the glass sheet is raised to a convenient work height for the operator. The glass sheet 20 is then firmly held in position using the combination of the vacuum suction cup 81 and a reversible vacuum/air system. Through the use of a hand tool (not shown), an adhesive strip 23 is then applied around the perimeter edge of the glass sheet 20. Once strip application is complete, the glass sheet 20 is then lowered back down onto the castor wheel track 36.

Figure 9:
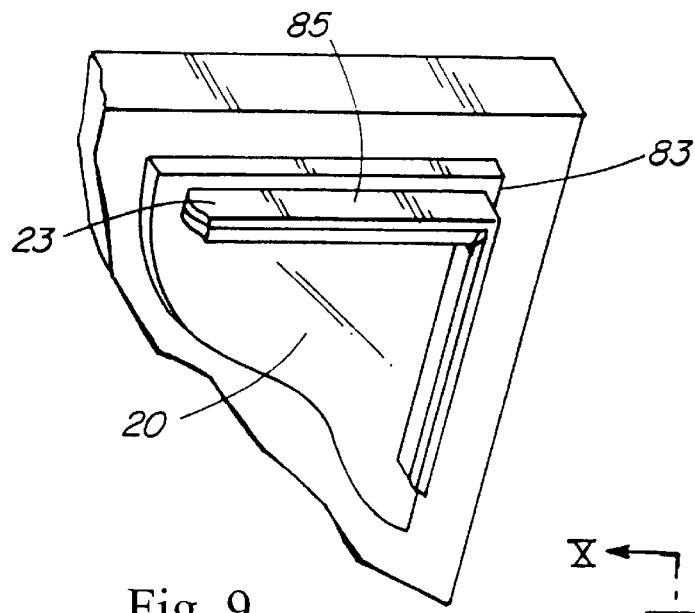
FIG. 9 is a top perspective detail of the adhesive strip application with a notched corner detail.

FIG. 9 shows a top perspective view of an adhesive strip application with a notched corner detail. At the corner 83 of the glass sheet 20, a half-circular slug has been removed from the flexible adhesive strip 23 and this allows the strip to be bent or flexed about a corner 83. The key advantage of this detail is that the vapor barrier backing 85 of the strip can be continuous.

Figure 10:
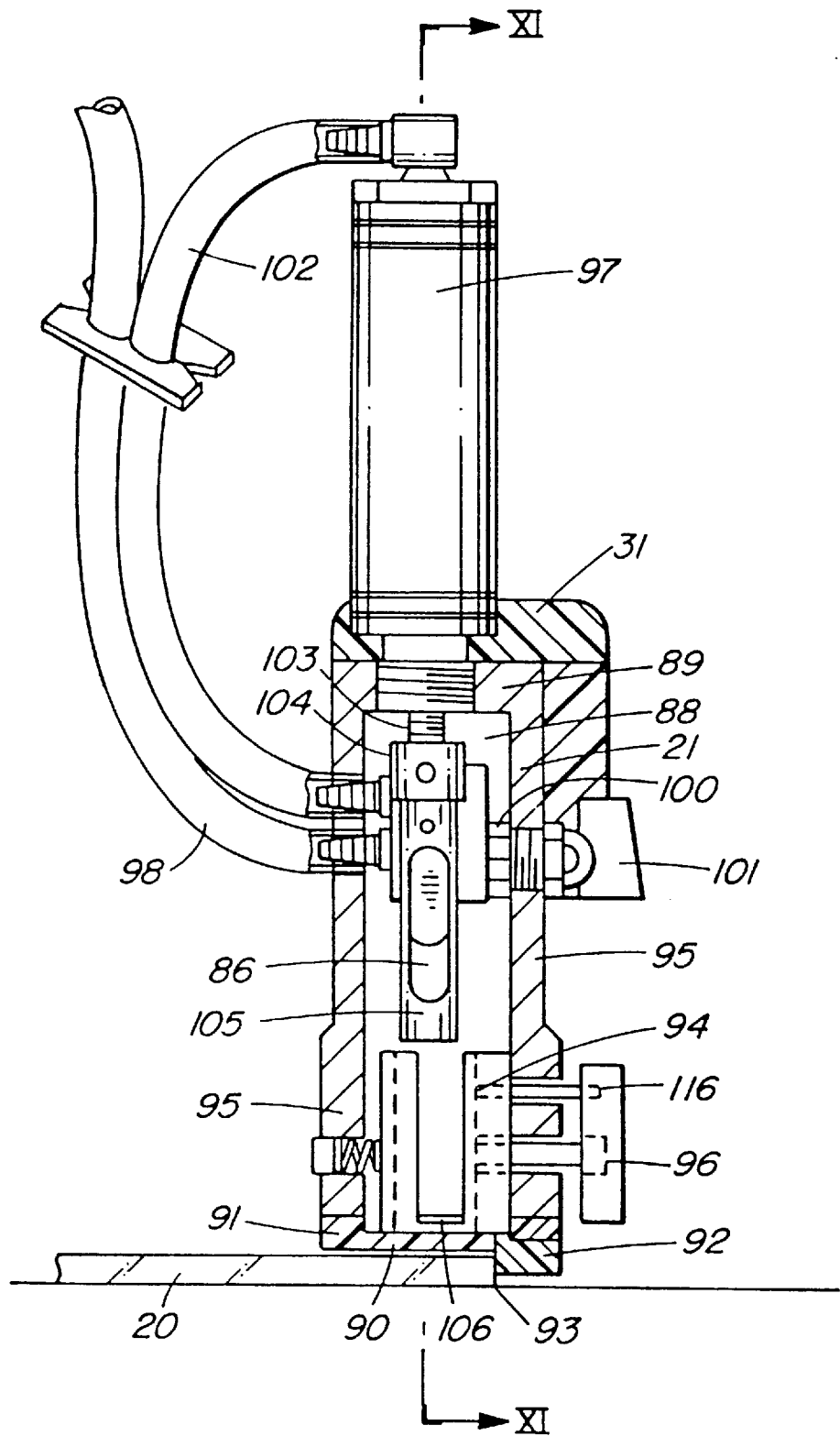
FIG. 10 is a front cross section through the hand tool for horizontal strip application taken on the line X—X in FIG. 11.

FIG. 10 shows a front cross section through a hand tool 21 for horizontal strip application. The body 88 is manufactured in part from a U-shaped metal channel 89 that has a lower surface 90. A removable base plate 91 is attached to the U-shaped metal channel 89. To prevent scratching or accidental chipping of the glass sheet 20, the base plate 91 extends over the entire lower surface 90 and the base plate is also manufactured from a smooth plastic material such as Teflon or polyacetal plastic.

An alignment bar 92 is attached to the base plate 91 and extends the length of the lower surface 90. The alignment bar 92 is also manufactured from a smooth, durable plastic that provides for sliding guided contact on the perimeter edge 93 of the glass sheet 20. Because the plastic alignment bar 92 is subject to extensive wear, the strip is reversible and is also made from a durable plastic material such as polyacetal. A U-shaped cradle or push-over block 94 is positioned between the two side-walls 95 of the U-shaped metal channel 89. The push-over block 94 is operated by means of a push-bar 96 to which it is connected by tubular supports 97 guided in bores in the right hand side wall.

A removable handle 31 is held in place by the pneumatic cylinder 97 that is screwed into and supported by the U-shaped metal channel 89. The cylinder 97 is centrally located on the U-shaped channel 89 and this ensures that the tool weight is balanced so that the tool can be comfortably held in the hand. To provide for multi-positional handling of the tool, tubing connections are kept to a minimum and this is achieved by using a spring-return type pneumatic cylinder 97. The air supply line 98 is connected to a valve 100 that is located between the two side walls 9S of the U-shaped metal channel 89. A lever bar 101 is connected to the valve 100. A second air line 102 connects the valve 100 to the pneumatic air cylinder 97. Mounted within the cylinder 97 is a piston that moves back and forth when activated.

When the tool is in operational use, the adhesive strip passes through the U-shaped push-over block 94. Attached to the piston shaft 103 is a two-piece punch assembly 86 that consists of a punch block 104 and a punch knife 105. When activated, the punch assembly 86 moves vertically downwards to the punch pad 106. To prevent the adhesive strip from adhering to the punch pad 106, the pad is manufactured from low-friction material such as Teflon.

Figure 11:
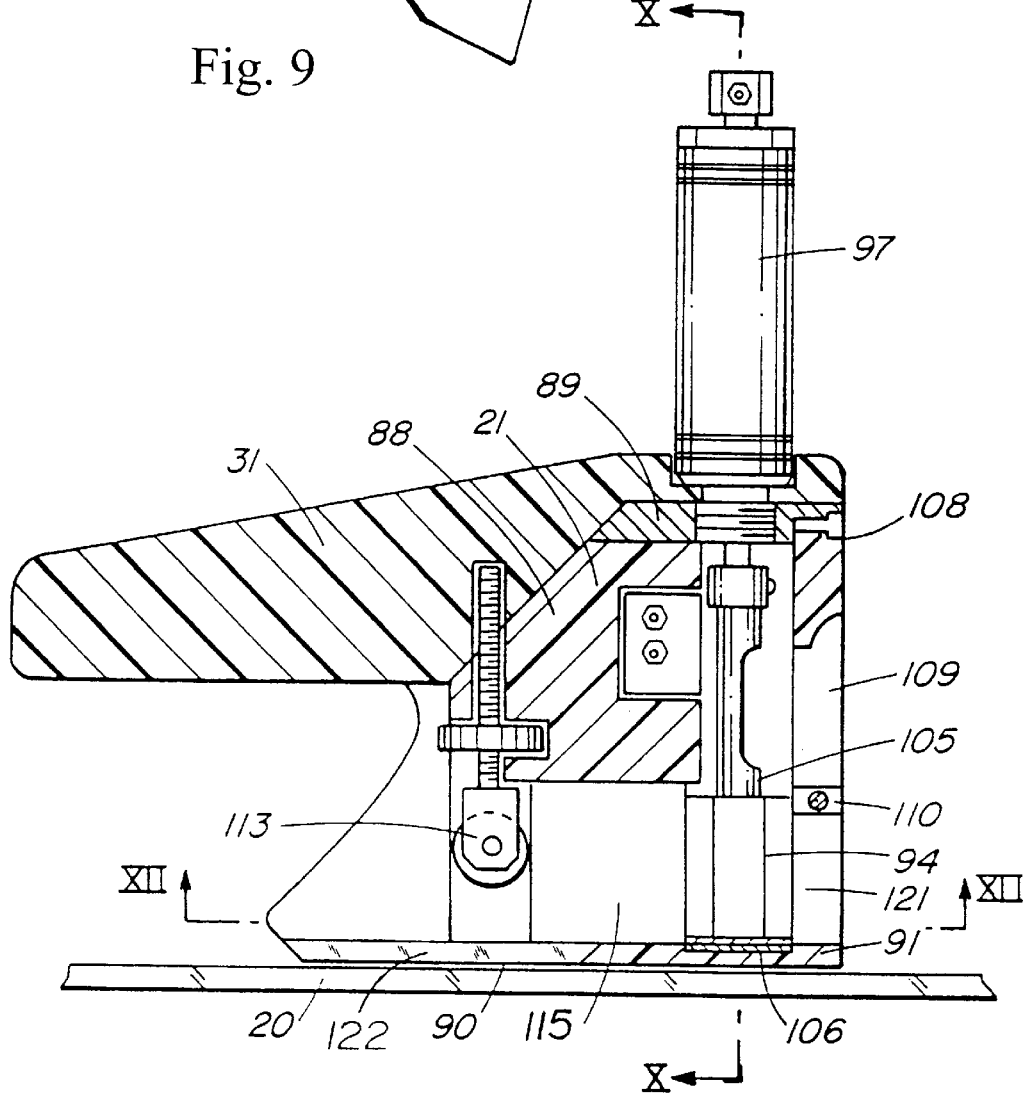
FIG. 11 is a side cross section through the hand tool for horizontal strip application taken on the line XI—XI in FIG. 10.

FIG. 11 shows a side cross section through the hand tool for horizontal strip application. Attached to U-channel metal channel 89 is a removable front face plate 108. During the corner-notching operation, the punch blade 105 when depressed removes a part-circular slug of material from the adhesive strip. Because of the side adhesive on the strip, the part circular slugs successively removed adhere together and form a half cylindrical tube that is ejected through a slot 109 in the front face plate 108.

Both sides of the front face plate 108 are smoothly contoured and direct the part-circular tube of slug material away from the glass substrate 20. The front face plate 108 also incorporates a roller 110 between the side of a slot in the front face that helps to direct and hold down the adhesive strip at the entry point 121. To prevent the roller 110 from sticking to the adhesive strip, the roller 110 is manufactured from Teflon plastic.

When the tool is in operational use, the adhesive strip passes beneath the roller 110 and through the U-shaped push-over block 94. The strip is then channelled between laterally spaced plastic spacer pieces (not shown) and beneath an adjustable pressure wheel 113. The pressure wheel 113 rides on the adhesive strip and ensures that the base plate 91 is not in direct contact with the glass sheet 20.

Figure 12:
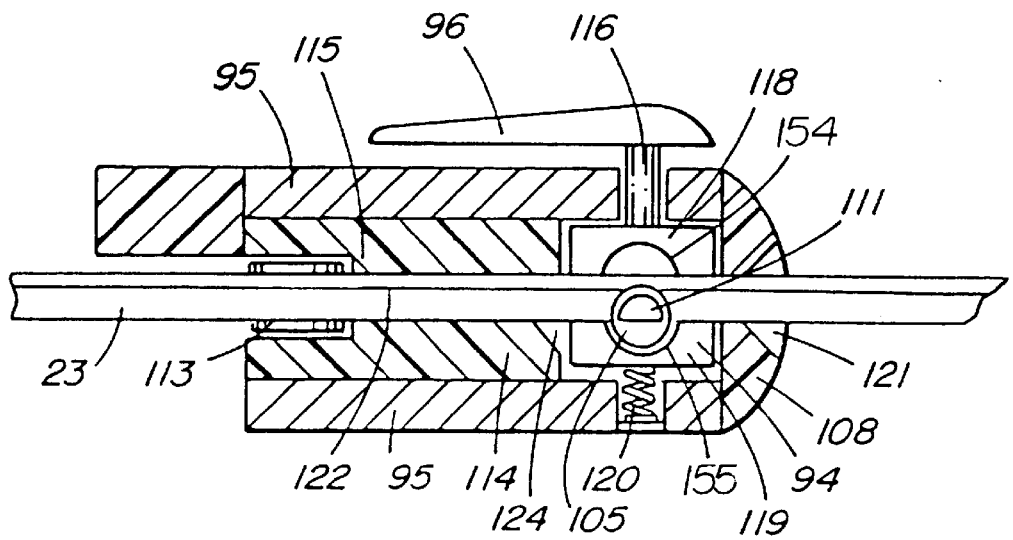
FIG. 12 is a sectional plan view of the push-over block taken on the line XII—XII in FIG. 10 with the punch positioned for the removal of a portion of the adhesive strip.

FIG. 12 shows a cross section plan view of the push-over block 94 as set up in its rest position for the corner notching operation. The adhesive strip 23 passes through the U-channel push-over block 94. The push-over block 94 is located between the two side walls 95 of the metal U-shaped channel 89. To cradle the adhesive strip during the corner notching and cut-off operations, the push-over block 94 incorporates two half-circular cut-outs 154 and 155. One side of the push-over block 118 is connected by the two tubular metal supports 116 that pass through a side wall 95 of the metal U-channel 89 and are connected to the push bar 96. The other side of the push-over block 119 is pressed against by a spring 120 that is anchored to the adjacent side wall 95 of the metal U-channel.

When the tool is in operational use, the adhesive strip 23 passes through the entry point 121 of the front face plate 108 and then passes through the U-shaped push-over block 94. When activated, the punch knife 105 removes a half circular material slug 111 from the adhesive strip 23. The plastic infill panels 114 and 11S guide the adhesive strip 23 through the open channel. The adhesive strip 23 is then directed downwards through a slot 122 in the base plate and is then adhered to the glass substrate by means of the adjustable pressure wheel 113.

Figure 13:
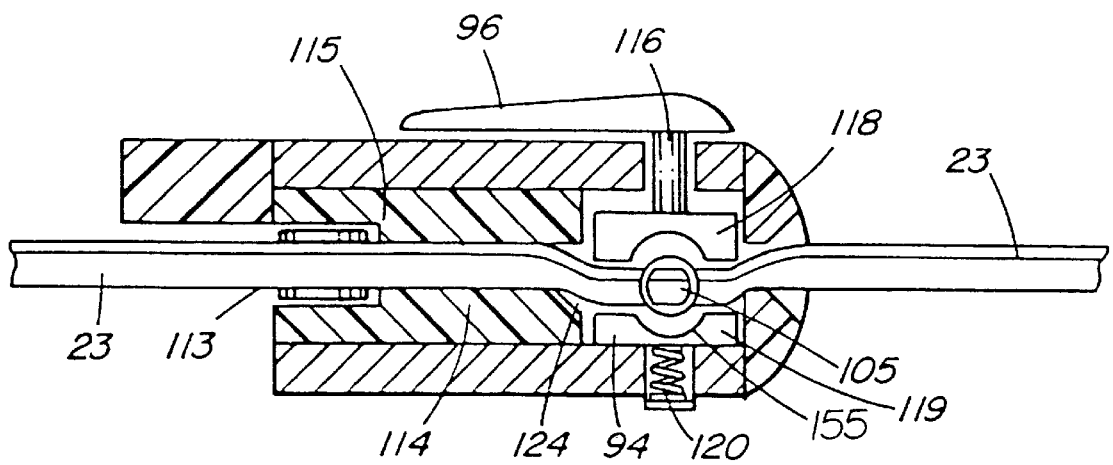
FIG. 13 is a view similar to FIG. 12 of the push-over block with punch positioned to cut-through the adhesive strip material.

FIG. 13 shows a cross section plan view of the push-over block 94 as set up for the final cut-off operation. By applying finger or thumb pressure to the push bar 96, the spring 120 is compressed and the push-over block 94 is moved over. As a result, the adhesive strip 23 is shifted out of alignment and the punch blade 105 is centrally located above the adhesive strip 23. When activated, the punch blade 105 cuts through and severs the strip 23.

To facilitate this lateral displacement of the adhesive strip 23, the plastic infill panel 114 features a chamfered corner edge 124. Another key feature is that because following the cut-off operation, the adhesive strip material can be held within the tool by maintaining the block 118 displaced as shown in FIG. 13 where it presses the strip against the edge of the entry point 121 and so there is no need to rethread the adhesive strip through the open channel within the tool to start a subsequent operation.

Figure 14:
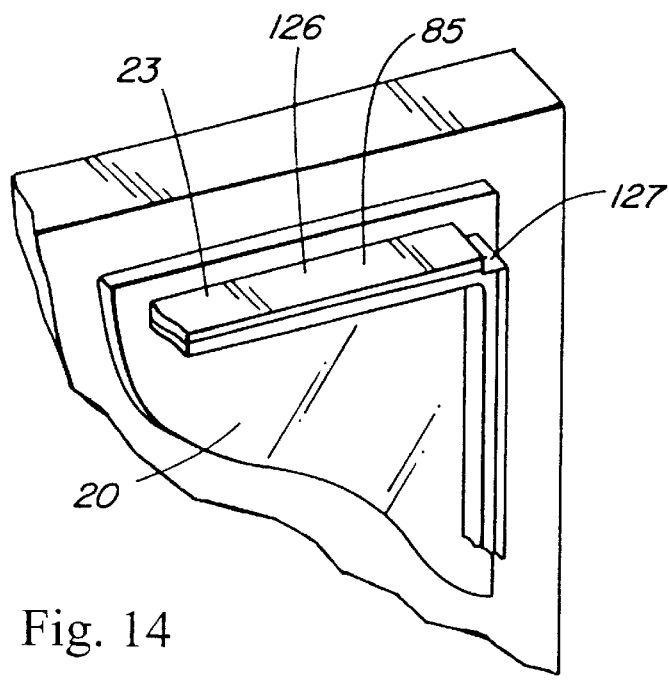
FIG. 14 is a top perspective detail of the adhesive strip application with an open-sided corner detail.
Figures 15, 16:
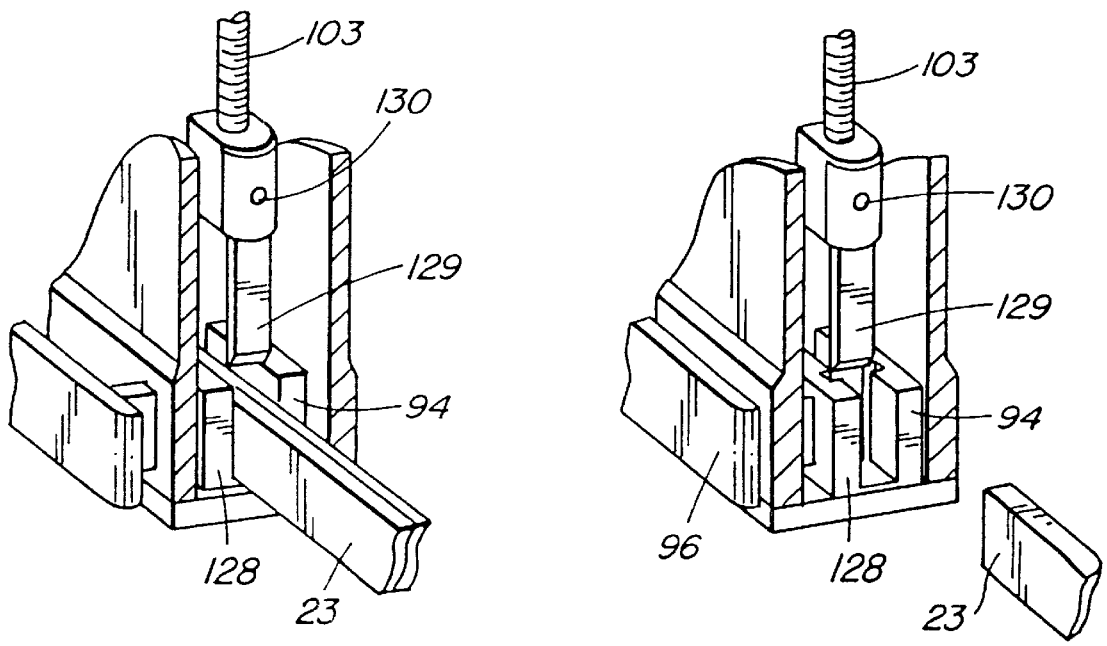
FIG. 15 is a top perspective cross-section view of the push-over block with chisel blade positioned for partial cut-through of the adhesive strip.
FIG. 16 is a view similar to FIG. 15 showing the chisel blade positioned for complete cut-through of the adhesive strip material.

FIG. 14 shows a corner detail for adhesive strip application incorporating an open cut corner 121. Generally, to ensure that the vapor barrier 85 is continuous at the back face 126, the preferred application detail is to corner notch the adhesive strip 23. When the adhesive strip 23 product is backed by a low permeable outer sealant, an alternative corner application detail is to partially cut through the back face 126 of the adhesive strip as shown in FIG. 15. Although the barrier film 85 is not continuous, the open-cut corner 127 allows for additional sealant material to be applied at the corners and thus ensures that the edge-seal integrity of the insulating-glass unit is not downgraded.

FIG. 15 is a top perspective cross-section view of an alternative push-over block 128 which uses a chisel blade 129 (instead of the punch blade) to produce the open cut corner 127 of FIG. 15. The chisel blade 129 is attached to a blade block 130 which in turn is attached to the piston shaft 103. When activated, the chisel blade 129 partially cuts through the back face of the adhesive strip 23.

FIG. 16 is also a top perspective cross-section of the push-over block 128 with a chisel blade 129. Through thumb or finger pressure on the push-bar 96, the push-over block 94 is moved over and when activated, the chisel blade 129 fully cuts through the adhesive strip 23. It should be noted that compared to the corner notching tool, the push-bar is located on the opposite side of the tool.

The alternative embodiments of the hand-held tool shown in FIGS. 17 through 21 incorporate a simplified structure for effecting the push-over action of the adhesive strip 23 within the channel 89 avoiding the complexity of the U-shaped cradle or push-over block 94 and the return spring.

Figure 17:
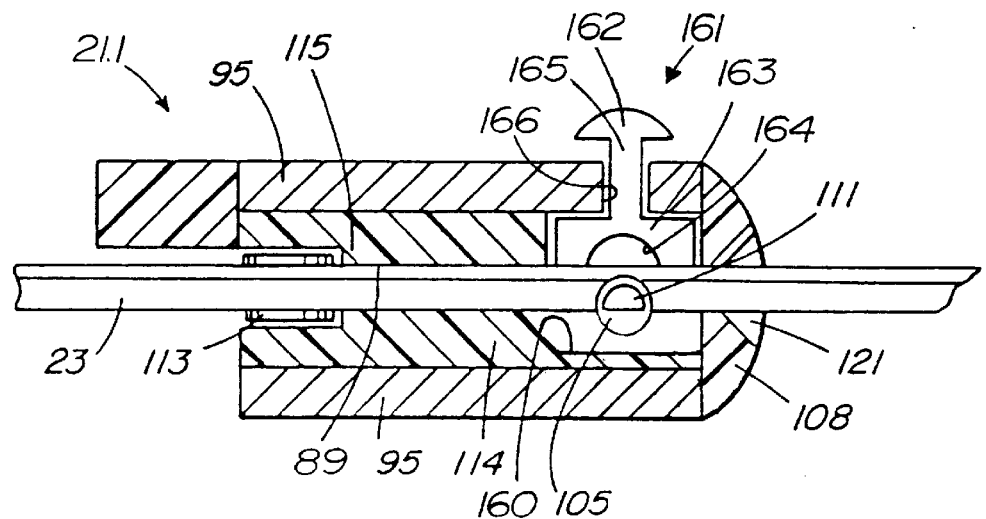
FIG. 17 is a cross-sectional view corresponding to FIG. 12 showing a modified hand-held tool.
Figure 18:
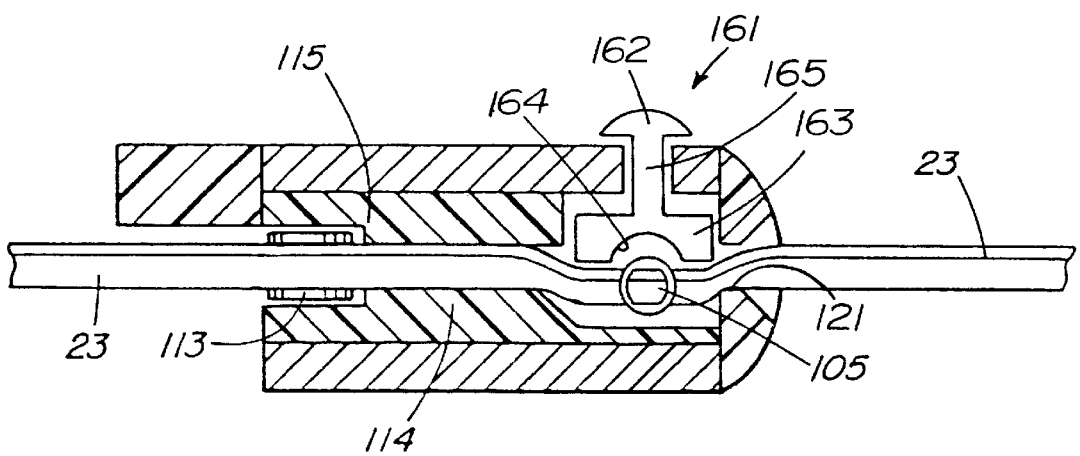
FIG. 18 is a view corresponding to FIG. 13 showing the modified tool of FIG. 17.

With reference to FIGS. 17 and 18 there is shown a modified hand-held tool 21.1 which is generally similar to the tool of FIGS. 10, 12 and 13 except in the manner in which the push-over action is achieved when it is desired to have the strip 23 severed by the punch blade 105. As seen in FIG. 17 the push-over block generally indicated at 161 includes a vertically elongate generally convex rectangular handle portion 162 which projects outside the tool and a block-like head 163 which is received within the tool adjacent one side of the channel 89, the head and the handle being interconnected by a narrow vertical web 165 that is slidable horizontally within a slot 166 formed in the side wall 95 of the hand tool. It will be seen that on the lateral face of the block that is presented towards the strip 23 there is a vertically elongate part circular recess 164 generally aligned with the punch blade 105. On the opposite side of the channel 89 the plastic in fill panel 114 defines a large recess 160 which is aligned with the push-over block head 163.

Operation of the embodiment of FIG. 17 is similar to that of FIG. 12. During normal operation when the strip 23 is being laid along the edge of the substrate, the strip passes linearly (when viewed in a direction at right angles to the substrate) through the tool 21.1 so that when the punch blade 105 is actuated to form a corner notch, it cuts out a slug 110 of arcuate outline which extends only partially across the width of the strip 23.

However when the strip is to be severed, the push-over block 161 is actuated by manual engagement of the handle 162 to press the head 163 laterally against the strip as illustrated in FIG. 18. In this arrangement the strip is now in complete alignment with the punch blade so that when the latter is actuated the strip is severed. The vertically extending recess or groove 164 ensures that the punch blade 105 does not foul the push-over block.

Once the strip 23 has been severed, on continuing movement of the hand tool 21.1 to the left as shown in FIG. 7, the remaining portion of the cut-off strip is applied to the substrate. It will be noted in FIG. 16 that in the actuated position of the push-over block 161 as shown, the severed end of the strip material 23 extending from the supply is clamped by the corner of the head 163 against the entry port 121 of the face plate 108, so that the strip does not have to be re-threaded into this entry port for subsequent strip applying operations.

Figure 19:
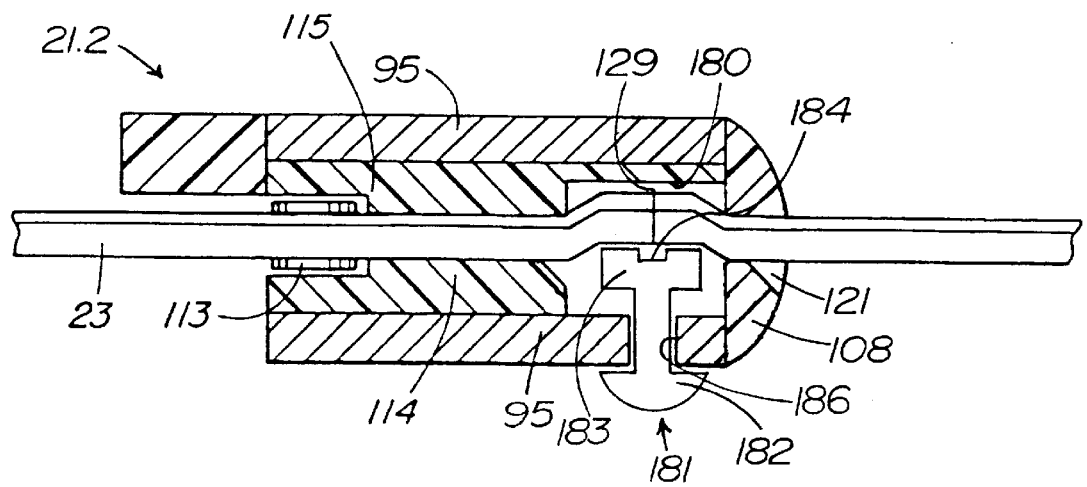
FIGS. 19 and 20 are views corresponding to FIGS. 17 and 18 respectively showing a further modified tool.
Figure 20:
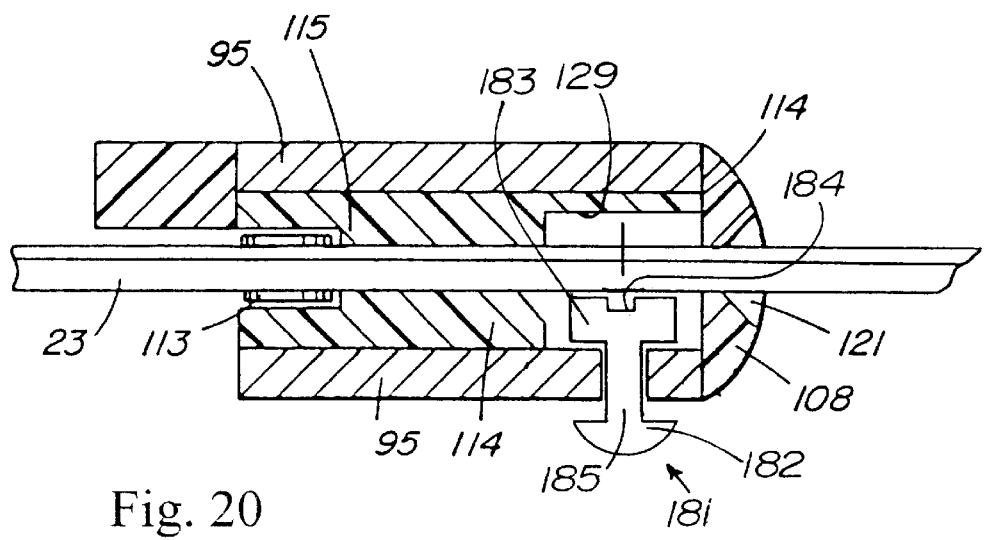
Figure 21:
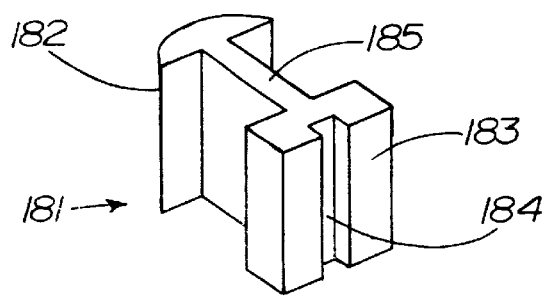
FIG. 21 is a perspective view of a push-over block used in the tool of FIGS. 19 and 20.

In FIGS. 19, 20 and 21 are shown portions of a hand tool 21.2 that is similar in construction to that shown in FIGS. 15 and 16 in that instead of a tubular punch it employs a cutter in the form of a chisel or knife blade 129. The action of the push-over mechanism in the embodiment of FIGS. 19 and 20 is substantially identical to that of the embodiment of FIGS. 17 and 18 except that to form a corner such as shown in FIG. 14 produced by the knife 129, the strip 23 is turned through 90° in the opposite sense to the corner-forming operation that is done when using the tool 21.1, and accordingly as compared to FIG. 17, in FIG. 19 the push-over mechanism is shown as operating from the opposite side of the tool. As noted, the tools illustrated are reversible, and as shown are set up for use by a right handed operative. However for a left handed operative the parts are reversed so that the push-over block actuator would be located on the opposite side of the tool from what is shown in FIGS. 10 to 20.

Referring to FIGS. 19 to 21 a push-over block 181 having a handle 182 extending on the exterior side of the tool and a head 183 positioned within the tool adjacent one side of the strip, is guided by a web portion 185 thereof in a narrow slot 186 of the housing to be movable transversely with respect to the strip 23 in alignment with the cutter knife 129. On the side of the head 183 facing the strip 23 there is a vertically extending clearance groove 184 which operates to avoid fouling of the blade 129 on the head 183 during operation. The structure of the push-over block 181 is more fully shown in FIG. 21. The block 181 is a low-cost component which can be fabricated for example in plastic material, and is small and relatively light in weight.

Operation of the tool shown in FIGS. 19 and 20 is substantially identical to that of the tool 21.1 shown in FIGS. 17 and 18, and accordingly need not be described in any detail. When the push-over block 181 is actuated, the strip 23 is moved transversely as shown in FIG. 20 to project into a large lateral recess 180 in the plastic infill panel 115. No springs or elaborate guides are required for the push-over block which is of lightweight construction, and is readily returned to the non-actuated position shown in FIG. 19, for example through the resilient force of the strip 23 which seeks to return to the straight condition. The push-over block is held captive by the interaction of the slot 186 with the web 185 and so cannot accidentally become detached from the tool.

Although FIGS. 10 to 21 show cross sections, plans, and perspective details of the hand tool for horizontal strip application set up for operation by a right handed or left handed as the case may be person, it will be appreciated by those skilled in the art that the tool is modular in design and can be easily modified for other operations. The main structural support for the tool is the U-shaped metal channel. By adding on different components such as handles, front face plates, back support plates and punch pieces, the tool operation can be modified from horizontal to vertical application, from right to left-handed use and from punch blade to chisel blade function.

In FIGS. 1 to 21 when describing the product invention, specific reference is made to the adhesive strip product, Super Spacer®, manufactured by Edgetech I. G. Inc. Although the equipment has been specifically developed for this product, it should be apparent to those skilled in the art that the invention described has wide application and is not limited to this particular adhesive strip product.

What is claimed is:

1. A hand tool for applying adhesive strip material to a substrate having an edge and a major face, said hand tool comprising:
    a body having a lower surface and a channel extending therethrough adjacent said lower surface for receiving a strip of material therein;
    a substrate positioning member located close to said channel on said lower surface of said body for guiding said tool along said edge of said substrate, said lower surface of said body being arranged to be elevated from said major face by said strip when said strip is fed through said channel;
    an adjustable wheel for applying pressure on said strip to urge said strip to adhere with said substrate major face; and
    a cutting mechanism mounted on said body, said cutting mechanism being selectively operable for partially cutting said strip and for fully cutting said strip;
    wherein said cutting mechanism includes a cutter and a displacement mechanism that is selectively operable to shift relative alignment of said cutter and said strip so that said cutter can partially or fully cut said strip as desired.

2. The hand tool of claim 1 wherein said displacement mechanism is selectively operable, in a non-actuated condition, to cause said strip within said channel to be only partially aligned with said cutter so that in this condition operation of said cutter is effective to partially cut through said strip, and, in an actuated condition, to cause the strip to be shifted laterally of said channel to be fully cut by said cutter.

3. The hand tool of claim 2 wherein said cutter comprises a hollow tubular punch that is mounted in said body to move towards and away from cutting engagement with the strip in said channel.

4. The hand tool of claim 2 wherein said cutter comprises a blade that is mounted in said body to move towards and away from cutting engagement with the strip in said channel.

5. The hand tool of claim 2 wherein said displacement mechanism in said actuated condition, is also effective to grip a severed end of the strip so that the strip does not separate from the tool and therefore does not require to be re-threaded into the tool for subsequent strip-applying operations.

6. The hand tool of claim 2 wherein said displacement mechanism comprises a pusher element carried by said body adjacent one side of said channel and mounted to move laterally of said channel between said actuated and non-actuated conditions;
    said channel including a lateral extension in a side thereof opposite to said pusher element and into which said strip is displaced in the actuated condition of the pusher element to lie in full alignment with said cutter to be fully cut thereby on actuation of said cutter.

7. The hand tool of claim 6 further including a spring coupled to said pusher element and operative to urge said pusher element towards the non-actuated condition.

8. The hand tool as claimed in claim 6 wherein said channel is partially defined in a U-shaped cradle that is operatively connected to said pusher element, said cradle defining a guideway which closely surrounds the strip passing through said channel, said cradle in the non-actuated condition of the pusher element being located within said guideway in alignment with said channel and the strip within said guideway in only partial alignment with said cutter, and said cradle in the actuated condition of said pusher element being laterally displaced into said lateral extension of the channel so that the strip within said guideway is in complete alignment with said cutter to be fully cut on actuation of said cutter.

9. The hand tool of claim 6, wherein said pusher element is arranged to lie in alignment with the strip.

10. A hand tool for applying adhesive strip material to a substrate having an edge and a major face, said hand tool comprising:

a tool body having a lower surface and a channel extending therethrough adjacent said lower surface for receiving a strip of material therein;

a substrate positioning member located close to said channel on said lower surface of said tool body for guiding said tool along said edge of said substrate, said lower surface of said body being arranged to be elevated from the major face by the strip when the strip is fed through said channel;

a cutting mechanism mounted on said tool body and including a cutter and a displacement mechanism for selectively shifting alignment of the strip with respect to said cutter so that said cutter can partially or fully cut said strip as desired, wherein said displacement mechanism includes a push over block laterally movably guided in said tool body for movement between a non-actuated condition in which said push over block locates the strip within said channel in only partial alignment with said cutter so that operation of said cutter is effective to partially cut through the strip, and an actuated condition in which said push over block locates the strip in a position laterally shifted with respect to said channel so that operation of said cutter is effective to fully cut through the strip.

11. The hand tool of claim 10, wherein said push over block is manually engageable to be moved from said non-actuated condition to said actuated condition, and is arranged to be automatically returned from said actuated condition to said non-actuated condition.

12. The hand tool of claim 10, wherein said push over block is manually engageable to be moved from said non-actuated condition to said actuated condition against a resilience of the strip, and is arranged to be automatically returned from said actuated condition to said nonactuated condition by the resilience of the strip.

13. The hand tool of claim 10, wherein said push over block comprises a generally U-shaped block disposed in said tool body, a push bar is provided on an outside of said tool body and is connected through said tool body to said push over block.

14. The hand tool of claim 13, wherein said push bar is elongated along a longitudinal direction of said tool body to lie in alignment with the strip.

15. The hand tool of claim 10, wherein said push over block comprises a unitary component including a block-shaped head portion disposed in said tool body, a handle portion disposed on an outside of said tool body and a web portion connecting said head portion to said handle portion.

16. The hand tool of claim 10, wherein said channel includes a lateral extension in a side thereof opposite to said push over block and into which the strip is displaced in said actuated condition of the push over block to lie in full alignment with said cutter to be fully cut thereby on actuation of said cutter, and wherein a spring is coupled to said push over block and is arranged to urge said push over block towards said non-actuated condition.

* * * * *